United States Patent [19]

Livsey

[11] 4,300,474

[45] Nov. 17, 1981

[54] APPARATUS FOR APPLICATION OF METALLIC COATINGS TO METALLIC SUBSTRATES

[75] Inventor: Livsey, Colne, England

[73] Assignee: Rolls-Royce Limited, London, England

[21] Appl. No.: 221,513

[22] Filed: Dec. 30, 1980

Related U.S. Application Data

[62] Division of Ser. No. 125,022, Feb. 25, 1980, Pat. No. 4,269,868.

[30] Foreign Application Priority Data

Mar. 30, 1979 [GB] United Kingdom ............... 11294/79

[51] Int. Cl.³ .............................................. C23C 17/00
[52] U.S. Cl. .............................. 118/641; 219/121 LC; 219/121 LE; 427/53.1; 427/191; 427/192
[58] Field of Search ....................... 427/53.1, 223, 226, 427/191, 192, 422; 219/121 LM, 121 LC, 121 LD, 121 LE; 118/620, 641

[56] References Cited

U.S. PATENT DOCUMENTS

| | | | |
|---|---|---|---|
| 3,872,279 | 3/1975 | Fairbairn | 219/121 LC |
| 3,957,474 | 5/1976 | Kobayashi et al. | 427/53.1 |
| 4,048,459 | 9/1977 | Earle | 219/121 LD |
| 4,125,926 | 11/1978 | Gale et al. | 427/53.1 |
| 4,157,923 | 6/1979 | Yen et al. | 219/121 LE |

*Primary Examiner*—Ralph S. Kendall
*Attorney, Agent, or Firm*—Cushman, Darby & Cushman

[57] ABSTRACT

A metallic coating is applied to a metallic substrate by directing a laser beam on to the substrate and simultaneously directing a gas stream containing entrained particles of the coating material on to the area of laser impingement on the substrate. The particles are melted by the laser beam to form a pool of molten coating metal. Relative movement is effected between the laser beam and substrate so that a pool of molten coating metal traverses the substrate to form a solidified metallic coating which is fused to the metallic substrate.

7 Claims, 1 Drawing Figure

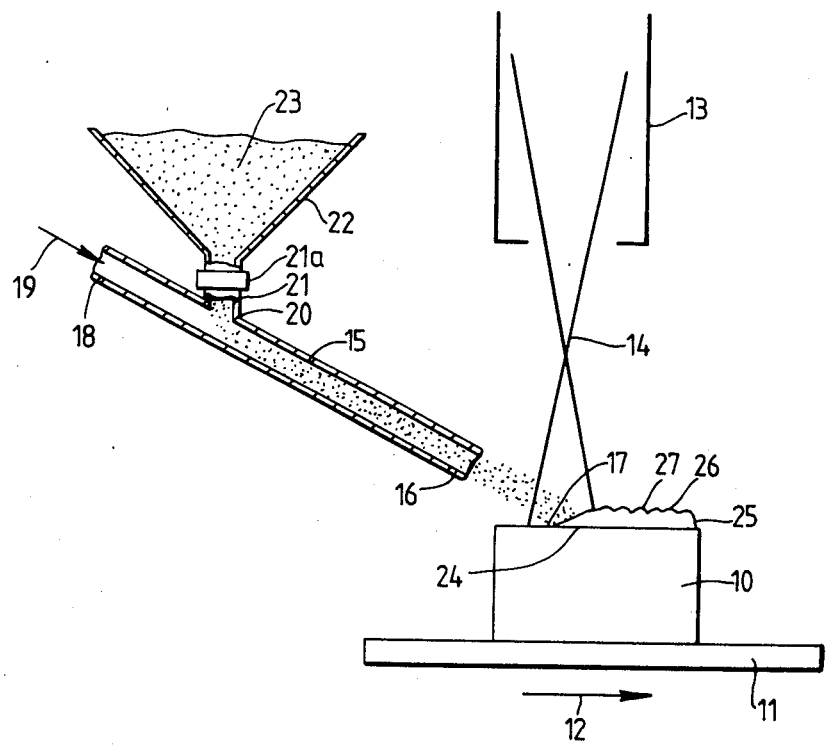

APPARATUS FOR APPLICATION OF METALLIC COATINGS TO METALLIC SUBSTRATES

This is a division, of application Ser. No. 125,022, filed Feb. 25, 1980 now U.S. Pat. No. 4,269,868.

This invention relates to the application of metallic coatings to metallic substrates.

BACKGROUND OF THE INVENTION

It is well known to provide metallic substrates with metallic protective coatings if those substrates are likely to encounter hostile conditions which could be detrimental to the properties of the basic substrate material. Such protective coatings may for instance be applied by the techniques commonly known as flame or plasma spraying. In those techniques, particulate alloys entrained in a hot gaseous or plasma environment are directed on to the substrate to be coated. The particles are in a molten or semi-molten state as they hit the substrate surface whereupon they cool and solidify to form a bond with the substrate. The bonding between the particles and the substrate surface is essentially mechanical in nature and consequently prone to failure if for instance impact or rubbing forces are encountered by the coating.

Improved bonding between metallic coatings and metallic substrates may be achieved by applying the coating to the substrate in rod form whilst simultaneously melting the application area with a high intensity heat source such as oxy-acetylene flame or a plasma or argon shielded arc. Since both the coating material and substrates are melted, a certain degree of mixing takes place between them so that the resultant bond is usually very strong. However the technique is difficult to control accurately and consequently coatings of variable consistency and depth are likely to result.

An alternative method of improving bonding between metallic coatings and metallic substrates comprises applying the coating material to the substrate in powder form so as to provide a layer of the powder which is subsequently melted using a laser beam. Whilst improved bonding results, it is difficult to accurately control the coating area and depth.

BRIEF SUMMARY OF THE INVENTION

It is an object of the present invention to provide an improved method of and apparatus for the application of metallic coatings to metallic substrates.

According to one aspect of the present invention, a method of applying a metallic coating to a metallic substrate comprises simultaneously directing a laser beam and a gas stream containing entrained particles of the metallic coating material on to the same area of the substrate so that said laser beam melts said particles to form a molten pool of said metallic coating material in the area of the impingement of said laser beam upon said substrate, and effecting relative movement between said laser beam and substrate whilst continuing to direct said particle carrying gas stream on to the area of laser beam impingement so that said area of laser beam impingement, and hence a pool of said molten metallic coating material traverses said substrate at such a rate that fusion takes place between said metallic substrate and said molten metallic coating material.

The diameter of said laser beam at said area of laser beam impingement upon said substrate is preferably within the range 1 to 4 mm.

Said relative movement between said laser beam and said substrate is preferably at a relative velocity of 4 to 20 mm per second.

The flow rate of said gas stream is preferably within the range 2 to 5 liters per minute.

The delivery rate of said particles of metallic coating material entrained in said gas stream on to said substrate is preferably within the range 45 to 55 mg. per second.

Said gas stream may be of argon.

According to a further aspect of the present invention, apparatus suitable for applying a metallic coating to a metallic substrate comprises a laser adapted to direct a laser beam on to the substrate to be coated, means adapted to direct a gas stream on to the area of impingement of said laser beam of said substrate and means adapted to meter particles of the metallic coating material into said gas stream such that said metered metallic particles are entrained therein and directed to said area of laser beam impingement on said substrate, means being provided to effect relative movement between said laser and said substrate such that in operation said area of laser beam impingement, and hence metallic coating particle impingement, traverses said substrate at such a rate that fusion takes place between said metallic substrates and said molten metallic coating material.

Said laser is preferably within the power range 800 to 2250 watts.

BRIEF DESCRIPTION OF THE FIGURE

The invention will now be described, by way of example, with reference to the accompanying FIGURE which is a diagrammatic representation of apparatus in accordance with the present invention.

DETAILED DESCRIPTION OF THE INVENTION

With reference to the drawing, the metallic substrate 10 to be coated is mounted on a support 11 which adapted by means not shown to translate at a constant speed in the direction indicated by the arrow 12. A laser 13 is mounted vertically above the support 11 so that its beam 14 is perpendicular to the direction of support translation 12.

An inclined tube 15 is mounted adjacent the laser 13 so that its lower outlet 16 is directed towards the area of impingement 17 of the laser beam 14 on the substrate 10. The upper inlet 18 of the tube 15 is connected to a source of argon so that argon flows in the direction indicated by the arrow 19, through the tube 15 and on to the area of laser beam impingement 17.

At a position 20 intermediate the tube inlet and outlet 18 and 16 a further tube 21 is connected to the tube 15. The further tube 21 interconnects the interior of the tube 15 with a hopper 22 containing particles 23 of the metal which is required to be coated on the substrate 10. The particles 23 fall under gravity through the tube 21 to be metered into the argon stream passing through the tube 15. An appropriate device 21a is provided in the tube 21 to ensure that the particles 23 are metered into the argon stream at a suitably constant rate. As soon as the particles 23 enter the tube 15, they become entrained in the argon stream and are directed thereby on to the area of laser beam impingement 17.

As soon as they reach the area of laser beam impingement 17, the particles 23 are melted by the laser beam 14 to form a pool 24 of molten coating metal. Translation of the substrate support 11 at a constant speed in the direction indicated by the arrow 12 results in a pool of molten metal 24 similarly translating to leave a solidified metal coating 25. Since the metallic substrate 10 is also heated by the laser beam 14, fusion takes place between the molten coating metal 24 and the substrate 10. Consequently the bond between the final solidified coating 25 and the substrate 10 is extremely strong.

As is apparent from the above description, as soon as the molten pool 24 of coating metal has been formed, all subsequent particles 23 are directed into that molten pool 24. Consequently very accurate control of the positioning of the molten pool 24 and hence the resultant coating 25 may be achieved. Moreover since the substrate support 11 is translated at a constant speed and the particles 23 are directed into the molten pool 23 at a constant rate, the resultant coating 25 is of a substantially consistent depth.

The action of translating the substrate 10 relative to the laser beam 14 has the effect of depositing the coating 25 in the form of partially coalesced beads 26 so that the coating surface 27 is somewhat uneven in appearance. Consequently if it is desired that the surface 27 should be flat, then conventional machining techniques such as grinding may be employed to achieve this end.

In an example in accordance with the present invention, a substrate 10 of the nickel base alloy known as Nimonic 75 was translated in the direction indicated by the arrow 12 at speed of 10 to 12 mm per second. The laser 13, which had a power output of 1900 watts, directed a beam 14 on to the substrate such that the beam diameter at its area of impingement 17 upon the substrate 10 was 2 mm. Argon was passed through the inclined tube 15 at a flow rate of 3 liters per minute and metallic coating particles 23 of 200-400 mesh particles size were metered into the argon flow to provide a particle delivery rate of 50 mg per second. The particles were of the cobalt based alloy known as Stellite 12 and had the following composition:

Carbon: 1.70-1.95% by weight
Silicon: 1.5 max % by weight
Manganese: 1.5 max % by weight
Aluminium: 1.0 max % by weight
Chromium: 27.0-31% by weight
Iron: 2.5 max % by weight
Molybdenum: 2.5 max % by weight
Nickel: 1.5 max % by weight
Titanium: 1.0 max % by weight
Tungsten: 8.0-10.0% by weight
Cobalt: Balance.

The resultant coating was found to be 1 mm thick and had a hardness of 560 HV.

Generally we have found that in order to achieve a satisfactory coating the following parameters should preferably be adhered to:

Laser Power: 800 to 2250 watts
Laser Beam diameter at substrate surface: 1 to 4 mm
Translation speed of substrate: 4 to 22 mm per second
Pitching of adjacent beads: 50%
Argon flow rate: 2 to 5 liters per minute
Metal Particle delivery rate: 45 to 55 mg per second.

If these parameters are adhered to, then using the previously mentioned nickel based alloy substrate and cobalt based alloy particles, we have found the resultant coatings to be 0.35 to 1.9 mm thick and have hardness in the range 450 to 600 HV.

Although the present invention has been described with reference to the entrainment of the metal coating particles in argon, it will be appreciated that other gases may be employed which may not necessarily be inert. Thus for instance air could be used. Moreover it will be appreciated that metallic substrates and coatings other than those formed from nickel and cobalt based alloys could be used in the method of the present invention.

I claim:

1. Apparatus suitable for applying a metallic coating to a metallic substrate comprising a laser arranged to direct a laser beam on to the substrate to be coated, said laser beam having an area of impingement on said substrate, means arranged to direct a gas stream on to the area of impingement of said laser beam on said substrate, means for metering particles of the metallic coating material into said gas stream such that said metered metallic particles of coating material are entrained therein and directed to said area of laser beam impingement on said substrate, and means to effect a relative movement between said laser and said substrate so that in operation, said area of laser beam impingement, and hence metallic coating impingement, traverses said substrate at such a rate that fusion takes place between said metallic substrate and said molten metallic coating material.

2. Apparatus as claimed in claim 1 wherein said laser is within the power range 800 to 2250 watts.

3. An apparatus as claimed in claim 1 in which said laser beam has a diameter at said laser beam area of impingement on said substrate in a range of 1 to 4 mm.

4. An apparatus as claimed in claim 1 in which said relative movement between said laser beam and said substrate has a relative velocity within a range of 4 to 20 mm. per second.

5. An apparatus as claimed in claim 1 wherein said gas stream has a flow rate within a range of 2 to 5 liters per minute.

6. An apparatus as claimed in claim 1 in which said metering means has a delivery rate of said particles of metallic coating material entrained in said gas stream on to said substrate within a range of 45 to 55 mg. per second.

7. An apparatus as claimed in claim 1 in which said gas stream is argon.

* * * * *

UNITED STATES PATENT AND TRADEMARK OFFICE
CERTIFICATE OF CORRECTION

PATENT NO. : 4,300,474
DATED : November 17, 1981
INVENTOR(S) : NORMAN BARRIE LIVSEY It is certified that error appears in the above-identified patent and that said Letters Patent are hereby corrected as shown below:

On the title page change "Item
[75] Inventor: Livsey, Colne, England" to

--[75] Inventor: Norman Barrie Livsey, Colne, England--

Signed and Sealed this

Ninth Day of February 1982

[SEAL]

Attest:

GERALD J. MOSSINGHOFF

Attesting Officer     Commissioner of Patents and Trademarks